(12) United States Patent
Benatti

(10) Patent No.: US 6,866,495 B2
(45) Date of Patent: Mar. 15, 2005

(54) APPARATUS FOR MANUFACTURING TREAD BANDS FOR VEHICLE TIRES

(75) Inventor: Vincenzo Benatti, Cinisello B. (IT)

(73) Assignee: Pirelli Coordinamento Pneumatici S.p.A., Milan (IT)

(*) Notice: Subject to any disclaimer, the term of this patent is extended or adjusted under 35 U.S.C. 154(b) by 117 days.

(21) Appl. No.: 10/224,275

(22) Filed: Aug. 21, 2002

(65) Prior Publication Data

US 2002/0190420 A1 Dec. 19, 2002

Related U.S. Application Data

(62) Division of application No. 09/050,886, filed on Mar. 31, 1998, now Pat. No. 6,495,081.

(30) Foreign Application Priority Data

Apr. 3, 1997 (IT) .......................................... MI97A0764

(51) Int. Cl.[7] .............................................. B29C 47/06
(52) U.S. Cl. .................... 425/131.1; 425/190; 425/380; 425/462; 425/467; 156/123; 156/394.1
(58) Field of Search .......................... 425/131.1, 133.5, 425/190, 192 R, 380, 462, 467; 156/123, 394.1

(56) References Cited

U.S. PATENT DOCUMENTS

| | | | |
|---|---|---|---|
| 3,975,126 A | 8/1976 | Wireman et al. ............ | 425/141 |
| 4,526,528 A | 7/1985 | Kline et al. ................ | 264/173.1 |
| 4,552,521 A | 11/1985 | Linnstaedter ................ | 425/462 |
| 4,556,376 A | 12/1985 | Sievers et al. .......... | 264/173.12 |
| 4,653,994 A | 3/1987 | Capelle ....................... | 425/185 |
| 4,944,666 A | 7/1990 | Hilke et al. ............. | 264/173.17 |
| 5,066,435 A * | 11/1991 | Lorenz et al. .............. | 264/40.5 |
| 5,132,357 A | 7/1992 | Endter et al. ............... | 152/905 |
| 5,474,817 A * | 12/1995 | Yada et al. ................... | 428/31 |
| 6,495,081 B2 | 12/2002 | Benatti .................. | 264/174.11 |

FOREIGN PATENT DOCUMENTS

| | | |
|---|---|---|
| EP | 0201337 | 11/1986 |
| EP | 0753391 | 1/1997 |
| FR | 2559420 | 8/1985 |
| GB | 1016011 | 1/1966 |
| GB | 1061991 | 3/1967 |
| GB | 2084506 | 4/1982 |

* cited by examiner

*Primary Examiner*—Joseph S. Del Sole
(74) *Attorney, Agent, or Firm*—Finnegan, Henderson, Farabow, Garrett & Dunner, L.L.P.

(57) ABSTRACT

An apparatus for manufacturing tread bands for vehicle tires includes at least one primary extrusion head, a preforming device, at least one auxiliary extrusion head, an auxiliary feeding channel, and an extrusion die. The preforming device includes a primary preforming channel operatively connected to the at least one primary extrusion head. The auxiliary feeding channel is operatively connected to the at least one auxiliary extrusion head. The auxiliary feeding channel connects to the primary preforming channel. A direction of the auxiliary feeding channel forms an angle between approximately 30° and 160° relative to a direction of the primary preforming channel. The extrusion die is connected to the preforming device and includes an extrusion outlet. The auxiliary feeding channel connects to the primary preforming channel substantially near the extrusion outlet.

13 Claims, 3 Drawing Sheets

APPARATUS FOR MANUFACTURING TREAD BANDS FOR VEHICLE TIRES

CROSS-REFERENCE TO RELATED APPLICATIONS

This application is a divisional of U.S. patent application Ser. No. 09/050,886, filed Mar. 31, 1998 now U.S. Pat. No. 6,495,081, in the U.S. Patent and Trademark Office, the contents of which are relied upon and incorporated herein by reference; additionally, Applicant claims the right of priority under 35 U.S.C. §119(a)–(d) based on patent application No. MI97A 000764, filed Apr. 3, 1997, in the Italian Patent Office.

BACKGROUND OF THE INVENTION

1. Field of the Invention

The present invention relates to an extrusion method for manufacturing tread bands for vehicle tires, as well as an extrusion apparatus for carrying said method into effect, said apparatus being of the type comprising: at least one primary extrusion head for feeding at least one primary elastomer material; at least one auxiliary extrusion head for feeding at least one auxiliary elastomer material; a preforming device having at least one primary preforming channel connected to the primary extrusion head; an extrusion die operatively disposed downstream of the preforming device and having an extrusion outlet located at the end of the primary preforming channel and defining an extrusion path therewith.

2. Description of the Related Art

It is known that in the field of tire manufacture for vehicle wheels, the tread band is obtained by extrusion of a workpiece in the form of a continuous strip which is subsequently cut into lengths of predetermined measure, each of which is adapted to be associated with the other tire components during an assembling step provided in the production process: during this step all workpieces forming the tire are fit together at room temperature, said pieces being cold too, since they come from a storage magazine.

In more detail, the stretch forming the tread band is applied crownwise either to the carcass, usually already toroidally shaped, directly on the carcass ply or plies, or to the belt structure previously wrapped over said carcass, in such a manner that the opposite side edges of the tread band join the end flaps of the tire sidewalls. Depending on planning choices, these end flaps are either applied to the carcass plies so as to be enclosed between the latter and the opposite side edges of the tread band, or directly applied in superposed relationship to the opposite side edges of the tread band itself.

Usually, the type of blend used in making the tread band depending on the required performance (wear resistance and grip on a dry and wet road surface, for example) has such chemical features that it appears difficult to obtain an efficient cold adhesion to the elastomers employed in making the carcass and belt structures and the tire sidewalls. Under this situation, in order to eliminate the necessity to submit the tread band to processes involving application of a petrol solution in order to restore the necessary stickiness during the tire assembling step, in many cases use is made of a so-called "skim coat" to be applied to the lower surface of the tread band and intended to get into contact with the carcass ply or belt structure. This skim coat is essentially made up of a thin layer of natural rubber-based blend that, being applied to the tread band when it is still hot immediately after its emerging from the extrusion head, can be efficiently anchored to the tread band blend and supplies an appropriate substrate for cold adhesion to the carcass without resorting to surface processes involving application of a petrol solution.

Likewise, in the case of overlapping of the sidewalls on the opposite side edges of the tread band, the side edges of the tread band as well are intended to be provided with two border inserts, the so-called "mini-sidewalls" also made of an elastomer material having such features that an efficient adhesion between tread band and sidewalls is ensured during the assembling step of the tire, usually by adopting the same blend for the sidewalls and mini-sidewalls in order to facilitate cold adhesion.

Application of mini-sidewalls to the tread band takes place by a co-extrusion process, a hot process therefore, which consists in employing on the same extrusion unit intended for the tread band formation, a second extrusion head supplying the blend for the mini-sidewalls along two auxiliary feeding channels converging at the opposite side portions of an extrusion outlet, in a direction substantially parallel to the course of the primary feeding channel through which the elastomer material intended for forming the true tread band is fed.

In the present state of the art, unlike the mini-sidewalls, the skim coat is produced in a separated unit, generally a calender, and rolled onto bobbins; each bobbin is then mounted on an appropriate unwinding device from which the skim coat is taken out for application to the tread band already provided with the optional mini-sidewalls, while said tread band is moving away from the corresponding extrusion unit.

Usually, since the skim coat is applied to the lower surface of the tread band, the unit carrying out unwinding of the skim coat is disposed under the whole tread band extrusion plant that consequently must be placed at a raised position, which will bring about complications in the plant structure and difficulties in acceding to all parts thereof.

In order to eliminate the requirement for use of a separated unit for skim coat production and a bobbin unwinding unit to deliver the skim coat to the tread band extrusion unit, attempts have been made to extrude the skim coat together with the tread band, in the same manner as pointed out with reference to mini-sidewalls, by adopting a co-extrusion method already known and successfully used for producing tread bands made up of two blends, where thickness of the lower blend layer is about half the thickness of the whole tread band.

The Applicant has however found that this co-extrusion method gives poor results when, in an attempt to make the skim coat, thickness of the underlying blend layer is reduced to values as low as two millimeters or less. Actually, in order to obtain very reduced thicknesses by extrusion, of 2 mm for example, due to swelling of the blend on coming out of the extrusion device, dies having apertures of about 1 mm are to be adopted and consequently possible blend impurities or dust may be entrapped into the die, thereby creating longitudinal scratches and therefore size irregularities in the extruded product or extrusion.

In addition, under such operating conditions checking of the blend flow rates at the different points of the extrusion section is very difficult and, therefore, sufficient assurances in terms of even and precise thickness of the skim coat and repeatability of results can be hardly given.

It is known that these difficulties are not present in calenders.

SUMMARY OF THE INVENTION

In accordance with the present invention it has been found that making the tread band provided with a skim coat in a co-extrusion process in which the skim coat itself has excellent qualities in terms of thickness evenness and thickness control is made possible if the blend intended for forming the skim coat is injected into the extrusion path of travel of the tread band in a direction perpendicular to, or in any case having a high angle of incidence with respect to the flow of the blend forming the tread band itself.

In a first aspect, the present invention relates to an extrusion method to make tread bands for vehicle tires comprising the steps of: conducting at least one primary elastomer material along an extrusion path comprising a primary preforming channel connected to an extrusion outlet the shape of which substantially corresponds to the required transverse section of the extruded product, conveying at least one auxiliary elastomer material to the extrusion path longitudinally passed through by the primary elastomer, said conveying being carried out in a direction transverse to the movement direction of the primary elastomer longitudinally crossing the extrusion path, in such a manner that the auxiliary elastomer is distributed in the form of a thin layer over at least one surface of the extruded product being formed along the extrusion path.

In more detail the auxiliary elastomer material is conveyed to the extrusion path at a point immediately upstream of, or substantially close to the extrusion outlet.

Preferably, the conveying transverse direction of the auxiliary elastomer is substantially perpendicular to, or in any case forms an angle included between 30° and 160° relative to the movement direction of the primary elastomer along the extrusion path.

In a possible embodiment, the method in question further comprises the step of conveying at least one secondary elastomer to a pair of secondary preforming channels converging at two opposite side portions respectively of the extrusion outlet, in such a manner that two border inserts are formed on the tread band and extend along the opposite edges of the tread band itself.

Advantageously, the thin layer is applied to the lower surface of the tread band which is such arranged as to come into contact with a tire carcass on which said tread band will be employed.

Still in accordance with the present invention, the above method is carried into effect by an extrusion apparatus to make tread bands for vehicle tires, characterized in that it further comprises at least one auxiliary feeding channel connected to the auxiliary extrusion head and converging on the extrusion path in a direction transverse to the longitudinal extension of the latter.

In more detail, the auxiliary feeding channel converges on the extrusion path substantially at said extrusion outlet, preferably in a direction forming an angle included between 30° and 160°, and more preferably of 90° relative to the longitudinal extension of the extrusion path.

In a preferential solution of the invention, the auxiliary feeding channel has a connection length formed in the preforming device which terminates at said auxiliary extrusion head, as well as an end length formed between the preforming device and the extrusion die. Said end length preferably is defined by a surface hollow formed in the extrusion die.

Advantageously, said preforming device comprises a preformer-holding drawer and a preformer operatively housed in said drawer, said primary preforming channel being formed between said preformer and preformer-holding drawer, and said auxiliary feeding channel being at least partly formed in the drawer.

In accordance with a second aspect of the invention, which is valid in itself also independently of the presence or not of the auxiliary feeding channel, the preformer is comprised of two end portions disposed in mirror image relationship and at least one central insert removably engaged between said two end portions, said central insert being interchangeable so as to adapt the width of the primary preforming channel to the width of the extrusion outlet arranged in said die.

Centering means comprising, for example, a keyway in the central insert of the preformer and a centering key in the preformer drawer enable the preformer to be fixed at a centered position relative to the drawer.

In a possible embodiment, the apparatus in question further comprises at least one secondary extrusion head to feed at least one secondary elastomer material, said preforming device having a pair of secondary preforming channels connected to said third extrusion head and converging at opposite side portions of said extrusion outlet respectively, so as to form two border inserts extending along the opposite edges of the tread band thus made.

In a third aspect, the present invention relates to an extrusion method to make tread bands with an elastomer insert, comprising the steps of:

conducting a primary elastomer flow along an extrusion path comprising a primary preforming channel connected to an extrusion outlet of a shape substantially corresponding to the required transverse section of the extruded product;

opening an empty region, adapted to be filled with another material, into the primary elastomer flow, conveying at least one auxiliary elastomer material to the extrusion path longitudinally passed through by the primary elastomer, said conveying being carried out in a direction transverse to the movement direction of the primary elastomer longitudinally passing through the extrusion path, in such a manner that the auxiliary elastomer is homogeneously distributed in the empty region opened in the primary elastomer flow.

In accordance with another aspect, the present invention relates to an extrusion apparatus to manufacture tread bands for vehicle tires comprising an elastomer insert comprising:

at least one primary extrusion head to feed at least one primary elastomer material, at least one auxiliary extrusion head to feed at least one auxiliary elastomer material, a preforming device having at least one primary preforming channel connected to the primary extrusion head, an extrusion die operatively disposed downstream of the preforming device and having an extrusion outlet disposed at the end of the primary preforming channel and defining an extrusion path therewith, characterized in that it further comprises:

at least one auxiliary feeding channel connected to the auxiliary extrusion head and converging on the extrusion path in a direction transverse to the longitudinal extension of the latter, and means for opening an empty region adapted to be filled with another material, in the primary elastomer flow, and means for enabling the auxiliary elastomer material coming from the auxiliary feeding channel to flow beyond the extrusion outlet and occupy said empty region.

BRIEF DESCRIPTION OF THE DRAWINGS

Further features and advantages will become more apparent from the detailed description of a preferred, but nonexclusive, embodiment of an extrusion method and related apparatus for manufacturing tread bands for vehicle tires in accordance with the present invention, given hereinafter with reference to the accompanying drawings, in which.

DETAILED DESCRIPTION OF THE PREFERRED EMBODIMENTS

Figure 1:
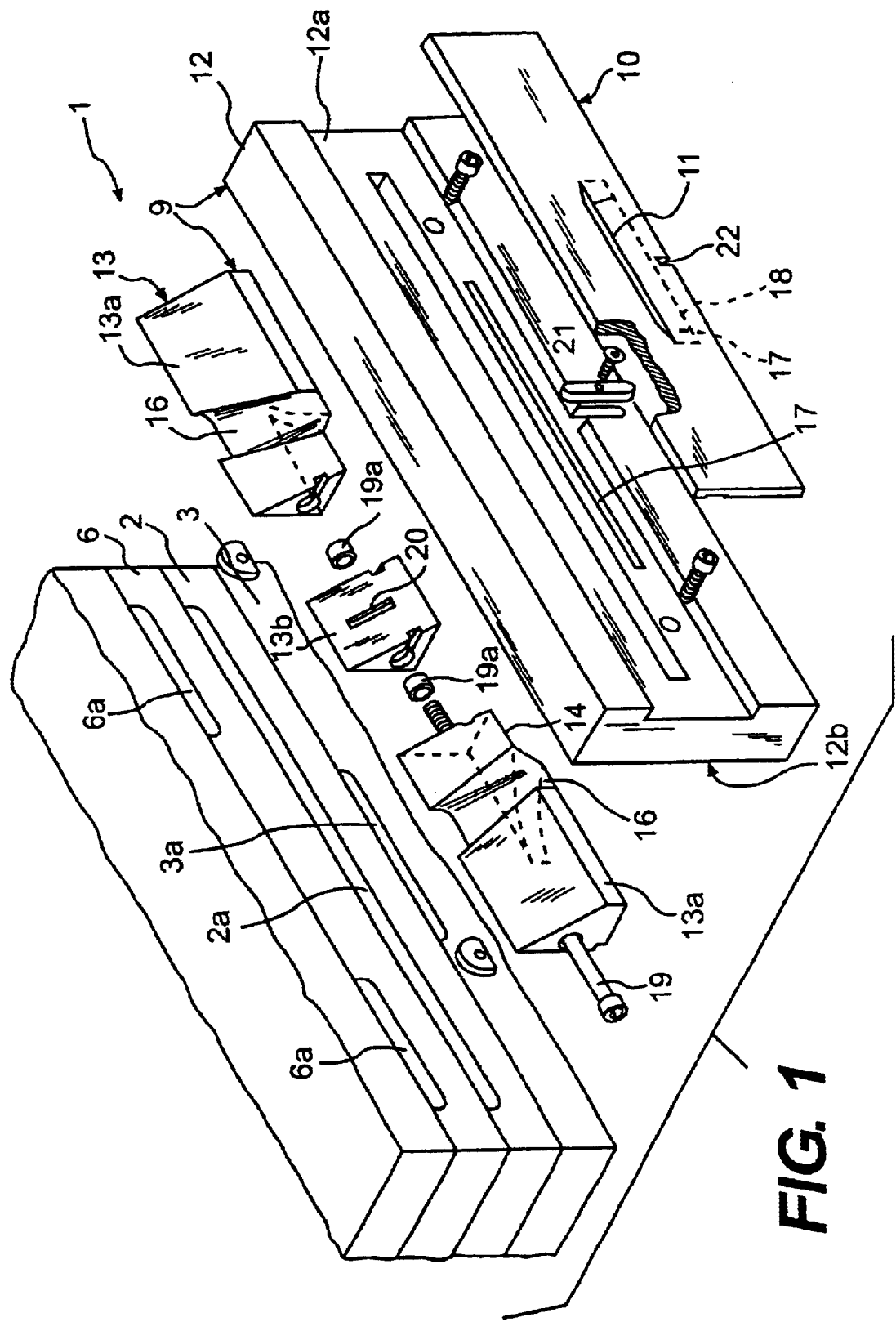
FIG. 1 is an exploded perspective view showing the main components of an extrusion apparatus for carrying into effect a method in accordance with the invention.

With reference to the drawings, an extrusion apparatus for manufacturing tread bands for vehicle tires in accordance with the present invention has been generally identified by reference numeral 1.

Apparatus 1 comprises at least one primary extrusion head 2 and one underlying auxiliary extrusion head 3 both only partly shown as known per se, which are arranged to feed a primary elastomer material 4 and an auxiliary elastomer material 5 respectively through a primary feed outlet 2a and an auxiliary feed outlet 3a.

In the embodiment shown, at least one secondary extrusion head 6 is also provided and it is arranged to feed a respective secondary elastomer material 7 through a pair of secondary feed outlets 6a placed at an overlying position relative to the primary feed outlet 2a.

Figure 3:
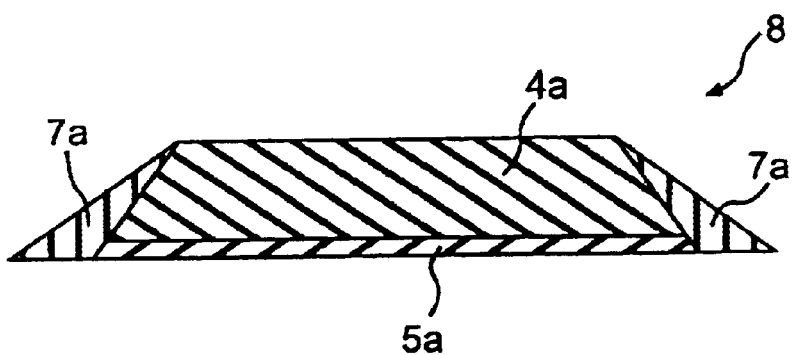
FIG. 3 shows an outline in cross section of an extruded product obtained by the method and apparatus in question.

Referring particularly to FIG. 3 and as better clarified in the following, elastomers from the respective feed outlets 2a, 3a, 6a are intended to give origin to a single extruded product generally denoted by 8 and made up of a true main portion or tread band 4a formed of the primary elastomer, provided at the lower part thereof with a so-called skim coat 5a formed of the auxiliary elastomer 5 distributed in the form of a thin layer under the lower surface of the tread band, as well as possible border inserts or so-called "mini-sidewalls" 7a each made up of the secondary elastomer 7 fed from one of the secondary outlets 6a.

The three different elastomer materials 4, 5 and 7 are fed to the respective feed outlets 2a, 3a and 6a through the corresponding extrusion head, each from a separated extruder, not shown as technically well known.

The extruded product 8, initially made in the form of a continuous strip of infinite length, is intended for being usually cut into stretches of predetermined length, each of which lends itself to be applied crownwise to a tire during the manufacturing step, in such a manner that, when the tire is finished, the tread band 4a will represent the ground-contacting area of the tire. Therefore, the primary elastomer 4 composition will, in the vulcanized tire, possess high qualities of grip to asphalt and wear resistance: this composition, as already seen, involves a poor stickiness of the primary elastomer at a raw state.

Stickiness features are then given to band 4a by the auxiliary elastomer 5 and secondary elastomer 7, if any, forming the skim coat 5a and mini-sidewalls 7a respectively. Actually, during the tire manufacturing step, the skim coat 5a is intended to supply a cold-attachment interface between the tread band 4a and underlying carcass or belt plies, whereas mini-sidewalls 7a will offer a valid adhesion surface, still in a cold condition, between the end flaps of the tire sidewalls and the tread band itself.

In order to overcome the remaining problem concerning an appropriate adhesion between the tread band 4a, auxiliary elastomer 5 and secondary elastomer 7, if any, which form the skim coat 5a and mini-sidewalls 7a respectively, these elastomers are hot-applied to the primary elastomer. Actually, mini-sidewalls 7a, skim coat 5a and tread band 4a are all directly co-extruded together.

After the above statements, it is pointed out that in the extrusion apparatus 1 immediately downstream of the extrusion heads 2, 3 and 6, a preforming device 9 is operatively provided, consecutively of which an extrusion die 10 is applied which has an extrusion aperture 11 the shape of which substantially corresponds to the required transverse section for the extruded product 8.

In more detail, the preforming device 9 is essentially comprised of a so-called drawer 12 having a front housing 12a for holding the die 10, as well as an inner housing 12b for holding a so-called preformer 13.

Preformer 13, of a substantially triangular section, is provided at the lower part thereof with a primary shaped hollow 14 adapted to define, together with a lower surface of the inner housing 12b of drawer 12, a primary preforming duct 15, connected to the primary feed outlet 2a and converging at aperture 11. Under this situation the outlet aperture 11 and primary performing duct 15 define an extrusion path along which the primary elastomer 4 is guided to be conveniently shaped depending on the final conformation to be obtained on the tread band 4a and the extruded product 8 as a whole.

In the embodiment shown, preformer 13 is also provided with a pair of secondary shaped hollows 16 formed on a front surface thereof and each converging at one of the opposite edges of the primary shaped hollow 14 through which the primary elastomer 4 passes. When preformer 13 is mounted within drawer 12, the secondary hollows 16 together with an upper surface of the inner housing 12b of drawer 12, define respective secondary preforming ducts each of which is connected to one of the secondary feed outlets 6a and converges at an end area of the extrusion aperture 11 to suitably guide the secondary elastomer 7 at said aperture so as to give origin to mini-sidewalls 7a.

The preforming device 9 is further provided with at least one auxiliary feeding channel 17 connected to the auxiliary extrusion head 3 and opening into the extrusion path followed by the primary elastomer 4, in a transverse direction intersecting the longitudinal extension direction of the extrusion path itself.

Figure 2:
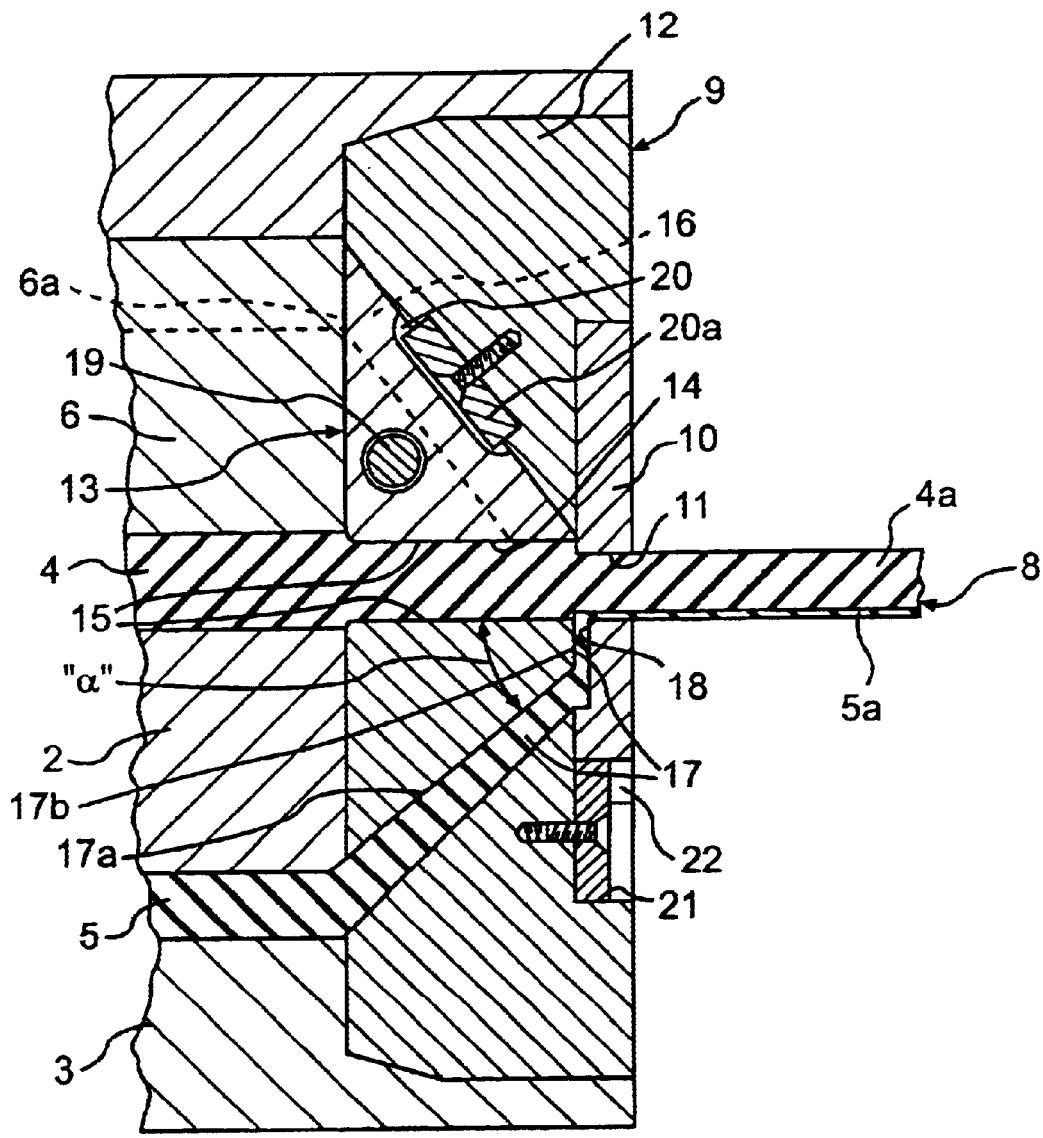
FIG. 2 is a median transverse section of the extrusion apparatus during an operating step.

In more detail, the auxiliary feeding channel 7 is preferably provided, as better seen in FIG. 2, with a first connection length 17a, obliquely formed in drawer 12 and terminating at the outlet 3a of the auxiliary extrusion head 3. Provided consecutively of the connection length 17a is a second end length 17b formed between the performing device 9 and extrusion die 10. More precisely, the end length 17b is defined by a surface hollow 18 formed in the extrusion die 10 substantially having the same width as that of the shaped hollow 14 and a depth included, by way of example, between 0.5 and 5 mm. The end length 17b opens into the extrusion path preferably at the extrusion aperture 11 or in any case at a point immediately upstream of the latter. As further shown in FIG. 2, an angle "α" is formed between connection length 17a and preforming duct 15. and is included between 30° and 160° relative to the longitudinal extension of the extrusion path and more preferably in a direction substantially perpendicular to the latter.

During operation of apparatus 1, the auxiliary elastomer 5 emerging from the auxiliary extrusion head 3 is conveyed into the extrusion path transversely of the elastomer 4 feed direction, over the whole width of the primary preforming duct 15 and interpenetrates the lower surface of elastomer 4 with a thrust force correlated with the rotation speed of the extruder screw feeding the auxiliary extrusion head 3.

It has been found that, under these conditions, a homogeneous distribution of the auxiliary elastomer 5 takes place giving rise to a coating effect in the form of a thin layer of a strictly constant thickness under the lower surface of the tread band 4a being formed at the exit of the extrusion path, even when thickness of the skim coat 5a to be obtained is very reduced, in the order of some tenths of one millimeter.

In accordance with a further feature of the apparatus in question, which can be advantageously utilized independently of arrangement of the auxiliary feeding channel 17 in the preforming device 9, preformer 13 is provided to be separable into at least three parts removably engaged with each other.

In more detail, provision is made for two end portions 13a disposed in mirror image relationship, each incorporating a side portion of the primary shaped hollow 14 and of the secondary shaped hollows 16 intended for forming the mini-sidewalls 7a. Removably engaged between the two end portions 13a, by a threaded tie rod 19 for example and upon interposition of possible centering bushings 19a, is at least one central insert 13b.

Centering means is provided for fastening preformer 13 at a centered position relative to drawer 12. In a preferential solution, this centering means essentially comprises a keyway 20 carried by the central insert 13b of preformer 13 and adapted to receive a key 20a arranged in drawer 12. A similar centering system as above, also comprising a key 21 and a keyway 22, is arranged between the die 10 and corresponding front housing 12a formed in drawer 12.

Advantageously, the central insert 13b is interchangeable in order to adapt the width of the primary preforming duct defined by hollow 14 as well as the distance between centers of the secondary preforming ducts defined by hollows 16, to the width of the extrusion aperture 11 provided in die 10 and, therefore, the width of the tread band 4a or in any case the extruded product 8 to be obtained. In other words, for each of the different tread band widths of the tyres being produced, there will be a respective die and a respective central insert 13b, to be always connected to the same pair of end portions 13a in order to form the tread hand 4a of the desired width.

Advantageously, since the end length 17b of the auxiliary feeding channel 17 is defined by hollow 18 arranged in die 10, as a result, each die 10 will have a hollow 18 of an appropriate width so as to adapt the width of the above mentioned end length 17b and consequently the width of the obtained skim coat 5a, to the size in width of the tread band 4a.

Figure 4:
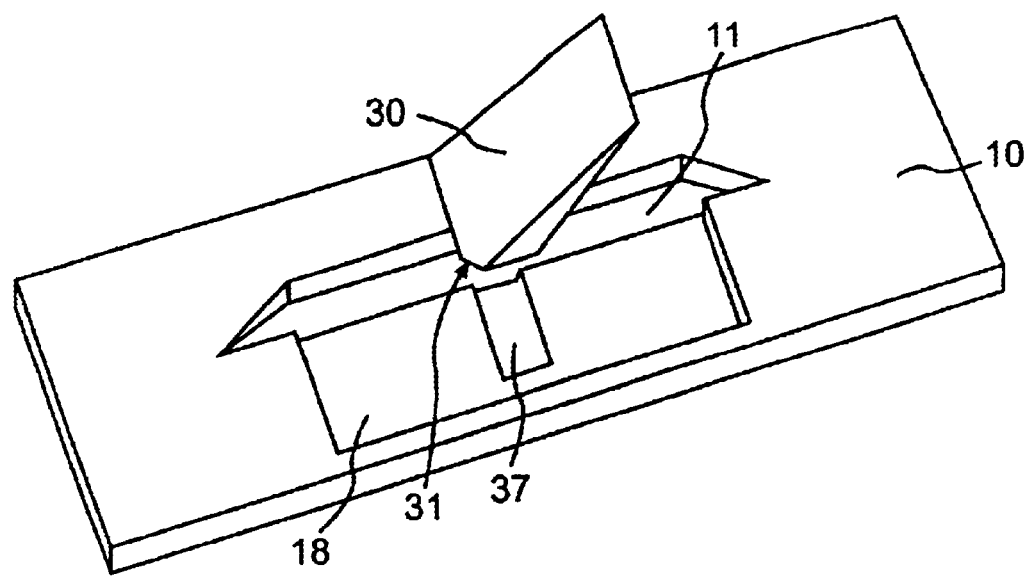
FIG. 4 is a perspective view showing the main components of the apparatus shown in FIG. 1 and comprising a separation element intended for carrying out a different method in accordance with the invention.

In accordance with another different feature of the apparatus in question, that can be advantageously utilized independently of the arrangement of the secondary shaped hollows 16 in the preforming device 9, a wedge-shaped separation element 30, as shown in FIG. 4, is provided to be advantageously applied to the die 10, close to the extrusion aperture.

The wedge-shaped element 30 is removably fastened to the die 10 preferably at a central position relative to the extrusion aperture 11, such disposed that it occupies the whole height of said aperture and conveniently oriented so that its tip extends within the preforming duct 15 in drawer 12.

This wedge-shaped element 30 further has a chamfer 31 on its surface facing the base of the extrusion aperture 11, to enable the auxiliary elastomer 5 coming from the auxiliary feeding channel 17 to flow beyond the extrusion aperture and occupy the empty region created in the extrusion by the presence of said wedge-shaped element through the extrusion aperture 11.

At said chamfer, the die 10 can have the same surface hollow 18 as already described, but it may be also provided with a further hollow 37 formed on the surface of hollow 18, preferably directed at right angles to the direction of the primary elastomer 4 flow, preferably as wide as the base of the wedge-shaped element, so as to create a channel of greater flow rate for the auxiliary elastomer 5 at said element 30; alternatively, the die 10 can have this further hollow alone, in the absence of hollow 18.

In more detail, the wedge-shaped element 30 performs a dual function, i.e. a first function consisting in opening an empty region in the primary elastomer 4 flow, which region is adapted to be subsequently filled with another material. The second function of said element 30 is that of causing a portion of the auxiliary elastomer flow to move towards and fill this region so as to form an extruded product 38 provided with an insert of elastomer material extending over its whole thickness.

It will be easily understood that, depending on the type of hollow present on the inner surface of die 10, different types of extrusion will be obtained: in the presence of hollow 18, with the addition or not of further hollow 37, the remaining flow of the auxiliary elastomer 5, that is the amount that did not flow to said empty region, is applied, with a coating effect, under the lower surface of the primary elastomer 4 part flowing externally of the wedge-shaped element 30, thereby obtaining an extrusion provided with a skim coat at the lower part thereof and comprising a longitudinally continuous insert of the same elastomer material as the skim coat.

In the absence of hollow 18, replaced by further hollow 37, an extrusion devoid of the skim coat will be obtained, which will comprise a longitudinally continuous insert of a different elastomer material.

It will be apparent that in accordance with the above described method the skim coat 5a and insert are made using the same material. However, a person of ordinary skill in the art will recognize that by the use of a further feeding channel for separately feeding the further hollow 37 disposed close to the wedge-shaped element, the insert can be easily made of an elastomer material different from the one adopted for making the skim coat.

Figure 5:
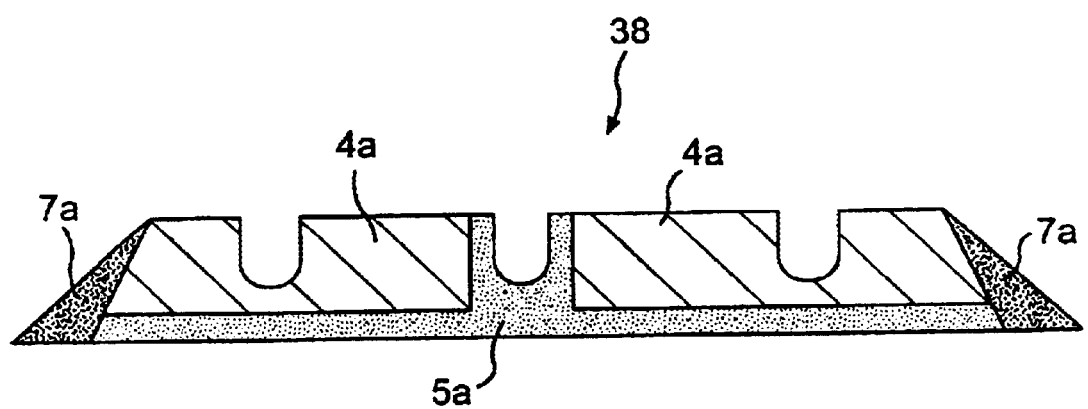
FIG. 5 shows an outline in cross section of an extruded product obtained by the method and apparatus represented in FIG. 4.

With reference to FIG. 5, it is possible to see that the auxiliary elastomer 5 is present both under the tread band 4a as skim coat 5a and in the central portion of extruded product 38.

Adoption of the wedge-shaped element 30 is particularly advantageous if a tread band having an insert of a different elastomer material is to be made, such as in the case of tread bands having a siliceous filler, which (as known) has an insulating character, to which an insert of conductive elastomer material is applied, which material can be for example the one adopted for a traditional skim coat. This solution enables conductivity to be achieved in tires which adopt this type of treads without on the other hand impairing the particular features they possess due to the presence of silica.

In a still more advantageously manner, the insert may be conveniently formed at different regions internally of the tread band 4a, by moving the fastening point of the wedge-shaped element 30 to the die 10 in a transverse direction.

Preferably, the insert is formed at a groove of the tread band by conveniently positioning the wedge-shaped element. In this way the insert portion in contact with the ground is reduced and consequently possibility of uneven wear of the tread band due to the presence of thread portions formed of different materials becomes smaller.

A person of average skill in the art will recognize that the wedge-shaped element 30 can be made of differently-shaped forms, provided they are adapted to perform the previously described functions.

The invention achieves many advantages over the known art.

First of all, use of an independent production unit expressly arranged to make the skim coat is eliminated. This, in addition to bringing about a clear simplification in plants, involves an important saving in the manpower required for checking operation of the plant itself, said mainpower being therefore reduced as compared with the known art.

Also overcome are problems resulting in the known art from the necessity to obtain a perfectly synchronous and simultaneous operation of the two units, i.e. one for extruding the tread band and one relating to the skim coat, where any speed variation in the semifinished products coming out of the respective units modifies the depositing synchronism, centring and stretching of the skim coat being applied to the tread band.

Also to point out is the fact that the important working waste that in the known art is formed during the plant set-up is greatly reduced. In fact, each time the plant in accordance with the known art is stopped, it is necessary to discard different meters of semifinished product corresponding to the lengths extending upstream of the area where coupling between the semifinished products themselves takes place. As a matter of fact, a correct mutual coupling of the semifinished products upon a new operation of the plant would be impaired due to maladjustment to which said semifinished products would be submitted during the starting step of the machine. This problem is overcome by the invention, according to which the skim coat is directly extruded together with the tread band.

Obtaining the skim coat directly by co-extrusion of the same with the tread band also overcomes all problems connected with achievement of a satisfactory attachment between skim coat and tread band without air lock, and in addition eliminates the necessity to adopt particular expedients and cares to enable the skim coat to be applied to a perfectly centred position relative to the tread band.

Another advantage achieved by the method and apparatus of the invention consists in preventing formation of surface discontinuity which in the known art took place between the mini-sidewalls and the skim coat ends, due to the fact that this skim coat was applied subsequently to the tread band extrusion and therefore projected the amount of its whole thickness relative to the lower surfaces of the mini-sidewalls themselves. This discontinuity had a tendency to cause formation of empty spaces resulting in air locks in the area included between the mini-sidewalls and the tire carcass. As a result of the above, in order to ensure adhesion of the mini-sidewalls to the carcass, strong rolling operations were in particular required, which operations, above all due to the use of modern blends containing silica-based fillers, had a tendency to cause an abnormal deformation of the workpiece and/or to modify the structure of the carcass and/or belt plies in an undesirable manner.

In addition, assurance of a perfect adhesion of the skim coat under the tread band, since operation is carried out under hot conditions, enables cheap elastomer blends to be utilized for making the skim coat, as compared with those required by the state of the art providing for application of a cold skim coat to a hot band.

Furthermore, the method and apparatus in question enable ready adjustment of the skim coat thickness, that can be easily modified by merely changing the rotational speed of the auxiliary extruder screw on which the flow rate of the elastomer material coming out of the auxiliary feed outlet 3a depends, as well as the interpenetrating degree of the auxiliary elastomer with the primary elastomer surface at the outlet.

It should be also recognized that the fact that said preformers can be made suitable for working of tread bands of different size by mere replacement of the central insert represents an important cost saving in respect of the known art, wherein for this adjustment operation replacement of the whole preformer was required, the cost of which was obviously much higher than that of the insert alone.

It is pointed out that terms "elastomer" and "elastomer material" as used in the present description identify the whole composition constituting the extruded semifinished products and not the only polymeric component of said materials.

Finally it will be apparent that the present description is given for illustrative purposes alone and not in a limiting sense and therefore a person skilled in the art, after understanding the invention as above described, will be able to easily carry out modifications, variations and replacements of the variables associated with the present invention for the purpose of meeting specific and fortuitous requirements, depending on needs.

What is claimed is:

1. An apparatus, comprising:
    at least one primary extrusion head;
    a preforming device;
    at least one auxiliary extrusion head;
    an auxiliary feeding channel; and
    an extrusion die,
    wherein the preforming device comprises:
    a primary preforming channel operatively connected to the at least one primary extrusion head,
    a preformer-holding drawer; and
    a preformer,
    wherein the preformer is operatively housed in the drawer, and wherein the primary preforming channel is formed between the drawer and the preformer,
    wherein the auxiliary feeding channel is operatively connected to the at least one auxiliary extrusion head,
    wherein the auxiliary feeding channel connects to the primary preforming channel,
    wherein a direction of the auxiliary feeding channel forms an angle between approximately 30° and 160° relative to a direction of the primary preforming channel,
    wherein the extrusion die is connected to the preforming device,
    wherein the extrusion die comprises an extrusion outlet, and wherein the auxiliary feeding channel connects to the primary preforming channel substantially near the extrusion outlet.

2. The apparatus of claim 1, wherein a shape of the extrusion outlet substantially corresponds to a transverse section of an extruded product.

3. The apparatus of claim 1, wherein the direction of the auxiliary feeding channel is substantially perpendicular to the direction of the primary preforming channel.

4. The apparatus of claim 3, wherein a shape of the extrusion outlet substantially corresponds to a transverse section of an extruded product.

5. The apparatus of claim 1, wherein the auxiliary feeding channel comprises a connection length formed in the preforming device and an end length formed between the preforming device and the extrusion die.

6. The apparatus of claim 5, wherein the end length is defined by a surface hollow formed in the extrusion die.

7. The apparatus of claim 1, wherein the auxiliary feeding channel is at least partly formed in the drawer.

8. The apparatus of claim 1, wherein the preformer comprises:
two end portions; and
at least one interchangeable central insert;
wherein the two end portions are disposed in a mirror-image relationship with respect to each other,
wherein the at least one interchangeable central insert is removably engaged between the end portions, and
wherein the at least one interchangeable central insert adapts a width of the primary preforming channel to a width of the extrusion outlet.

9. The apparatus of claim 8, further comprising means for centering the preformer relative to the drawer.

10. The apparatus of claim 9, wherein the centering means comprises:
a keyway; and
a centering key;
wherein the keyway is disposed in the at least one interchangeable central insert, and
wherein the centering key is disposed in the drawer.

11. The apparatus of claim 1, further comprising:
at least one secondary extrusion head; and
a pair of secondary preforming channels;
wherein the secondary preforming channels are operatively connected to the at least one secondary extrusion head, and
wherein the secondary preforming channels connect to opposite side portions of the primary preforming channel substantially near the extrusion outlet.

12. An apparatus, comprising:
at least one primary extrusion head;
a preforming device;
at least one auxiliary extrusion head;
an auxiliary feeding channel; and
an extrusion die,
wherein the preforming device comprises:
a primary preforming channel operatively connected to the at least one primary extrusion head,
wherein the auxiliary feeding channel is operatively connected to the at least one auxiliary extrusion head,
wherein the auxiliary feeding channel connects to the primary preforming channel,
wherein a direction of the auxiliary feeding channel forms an angle between approximately 30° and 160° relative to a direction of the primary preforming channel,
wherein the extrusion die is connected to the preforming device,
wherein the extrusion die comprises an extrusion outlet,
wherein the auxiliary feeding channel connects to the primary preforming channel substantially near the extrusion outlet;
means for restricting part of a flow of at least one first elastomeric material substantially near the extrusion outlet to open an empty region in the flow; and
means for enabling at least one second elastomeric material to at least partially fill the empty region in the flow.

13. The apparatus of claim 12, wherein the means for restricting part of the flow comprises a substantially wedge-shaped element operatively connected to the extrusion die.

* * * * *